(12) United States Patent
Ogino et al.

(10) Patent No.: US 6,720,055 B2
(45) Date of Patent: Apr. 13, 2004

(54) LABEL SHEET FOR ELECTROPHOTOGRAPHY AND IMAGE FORMING METHOD WITH USE THEREOF

(75) Inventors: Takashi Ogino, Ebina (JP); Kiyoshi Hosoi, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 10/090,801

(22) Filed: Mar. 6, 2002

(65) Prior Publication Data
US 2003/0059564 A1 Mar. 27, 2003

(30) Foreign Application Priority Data
Sep. 19, 2001 (JP) .......................... 2001-285717

(51) Int. Cl.⁷ .............................. B32B 33/00
(52) U.S. Cl. ............... 428/40.1; 428/195.1; 428/34.9; 428/41.8; 428/343
(58) Field of Search .............. 428/41.8, 40.1, 428/343, 34.9, 195.1

(56) References Cited

U.S. PATENT DOCUMENTS 5,885,678 A * 3/1999 Malhotra ............... 428/32.29
6,231,958 B1 * 5/2001 Kim et al. ............... 528/272

FOREIGN PATENT DOCUMENTS

| JP | A 62-116945 | 5/1987 |
| JP | B2 6-68639 | 8/1994 |
| JP | A 7-248636 | 9/1995 |
| JP | B2 2807062 | 7/1998 |
| JP | A 11-231671 | 8/1999 |
| JP | A 11-300898 | 11/1999 |
| JP | A 2000-235275 | 8/2000 |

* cited by examiner

Primary Examiner—Bruce H. Hess
Assistant Examiner—Tamra L. Dicus
(74) Attorney, Agent, or Firm—Oliff & Berridge PLC

(57) ABSTRACT

A label sheet for electrophotography, constituted of a label base member and a separator base member both made of resin film, and an image forming method with use thereof. Difference of thermal shrinkage rates in an MD direction between the label body and the separator of the label sheet after heat treatment for 5 minutes at 150° C. is in the range of −0.3% to 0.1%. Stiffness E·t³, a function of a tensile elasticity rate E (N/mm²) of the separator at 135° C. and thickness t (mm) of the separator at 23° C, 50% R.H., is 0.21 N·mm or more. Occurrences of winding around a fuser and marks of winding are suppressed, curls are small, and toner cracks do not appear even if printed matter is left in conditions of high temperature and high humidity.

18 Claims, 4 Drawing Sheets

FOLDING LINE

LABEL SHEET FOR ELECTROPHOTOGRAPHY AND IMAGE FORMING METHOD WITH USE THEREOF

BACKGROUND OF THE INVENTION

1. Field of the Invention

The present invention relates to a label sheet for electrophotography and an image forming method with use thereof, used for electrophotographic copying machines and printers.

2. Description of the Related Art

Accompanied by colorization and digitization of electrophotographic copying machines and printers, higher resolution and speed-up in electrophotography have been studied. Particularly, digitization of inputting and outputting images has been developed for full-color electrophotographic copying machines and printers in order to respond to higher resolution and higher processing speed of images, and thereby methods for inputting images and methods for processing, developing, transferring and fixing input images have been significantly improved. Further, each component, developers, photo-conductors, and the like, has also been improved corresponding to high definition and high quality of color recording in digital mechanisms.

Accompanied by higher resolution of full-color copying machines and printers, A variety of media such as not only high quality paper but also coated paper, cast-coated paper, plastic materials, seal materials and the like having large basis weight have been used for recording media. Particularly, seal and label materials and the like have been used for labels and a variety of usages such as photo seals have been proposed. The materials of such seals and labels have been developed using high quality paper, coated paper, plastic or the like as a base (base member).

However, in cases of using a recording medium composed of a high quality paper base, there is a tendency for heat-melted toner to be loaded into the high quality paper at the time of fixing, which creates a rough touch and non-uniformity of image gloss on the image. Owing to this, images having high quality cannot be obtained. In cases of using a recording medium composed of a coated paper base at high humidity, there is a tendency for the recording medium to produce blisters when heated while fixing. Owing to this, the recording medium cannot be used. In cases of using a recording medium composed of a film base, the stiffness of the recording medium becomes poorer by heating while fixing. Owing to this, there is a tendency for the recording media to be wound around the fuser (often referred to as "fuser winding" hereinafter) and to produce marks of winding. Further, the process tends to produce curls curving in an arc in a portion or whole of the recording medium by thermal shrinkage of the recording medium. Owing to this, when the curls are significant, the edge portion of the recording medium comes to be folded in the machine (edge fold).

Full-color copying machines and printers have been developed to respond to speed-up in addition to higher resolution, which causes the recording medium a large heating load in the heat-fixing device, resulting in a lot of troubles on the fixing device described above.

In order to improve the problems concerning the curls on the fuser described above, in Japanese Patent Application Laid-Open (JP-A) No. 2000-235275, Japanese Patent No. 1941236 and Patent No. 2807062, it is disclosed that curls are improved by defining the thermal shrinkage rate of the whole film medium (label sheet for electrophotography). However, the label sheet (label sheet for electrophotography) comprises a surface base member (label body) and a back surface base member (separator), both of which are temporarily adhered via an adhesive (adhesive layer). The surface base member and the back surface base member are different from each other in forms, structures and the like. Owing to these differences, when the difference in the thermal shrinkage between these members is large, large curls which induce a trouble on the copying machine or printer is produced, resulting in that the techniques described in the publications described above cannot solve the problem about the curls of the label sheet.

On the other hand, in JP-A No. 11-300898, the technique defining thermal shrinkage rate of a label body base member (label base member) is disclosed. However, it is difficult for this technique to resolve the problem about curls when the shrinkage rate of a separator is large.

To improve these problems, the technique defining shrinkage rates of the surface and the back surface (label body and separator) of a label sheet to 1% or less respectively is disclosed in JP-A No.06-337537. However, even though each shrinkage rate of the surface and back surface is within 1%, if difference in the thermal shrinkage rates between those of the surface and the back surface is large, it is difficult for the technique described in the Publication to suppress appearance of curls, which may cause problems about curls.

In cases of using a resin film as a recording medium, since stiffness of the film becomes poor significantly by heating upon fixing, it may often occur that the resin film is wound around the fuser or marks of winding are produced on the resin film. Further, it is not possible to make image gloss of printed matters printed using a resin film uniform. On the other hand, in cases of a label sheet using high quality paper as a base member of a label body and/or a separator, curls may occur by significant expansion and shrinkage of the label sheet caused by the change of temperature and humidity, and the image printed on the label body expands with the label sheet and cracks because the image cannot go along with the expansion (such cracks is referred to as "toner crack" hereinafter).

Further, to improve fuser winding, the technique defining the elasticity and stiffness of a recording medium at an ambient temperature is disclosed in JP-A Nos. 62-116945 and 11-231671. However, the elasticity and stiffness of the recording medium remarkably decrease by heating on fixing. For this reason, it is not possible to suppress the fuser winding even though the elasticity and stiffness of the recording medium at an ambient temperature are defined.

On the other hand, the technique that an image receiving layer (toner image receiving layer) with a thickness of 4 $\mu$m or more made of a thermoplastic resin having 50 to 80° C. of glass transfer temperature is provided on the label body of a label sheet and that the image gloss is made uniform by loading toner on the image receiving layer into the image receiving layer when fixing is disclosed in JP-A No. 7-248636.

With the technique described in this Publication, image gloss can be uniformed by provision of an image receiving layer. However, curls may easily occur after fixing because it is not particularly taken into consideration to prevent occurrence of curls in that Publication. Moreover, the label sheet easily produces winding around the fuser and marks of winding because the image receiving layer does not have releasability.

From the above description, when printing is done using a label sheet fabricated by the technique in the Publication described above, it is not possible to prevent from producing winding of a label sheet around the fuser and marks of winding on the label sheet when it is printed. Even though such winding of a label sheet around the fuser is not produced, it is difficult to prevent problems such as appearance of curls of printed matters, edge folds due to remarkable curl appearance, toner cracks of printed matters by changes of temperature and humidity and the like.

SUMMARY OF THE INVENTION

The present invention has an object to solve the problem described above. In other words, an object of the present invention is to provide a label sheet for electrophotography composed of a resin film base and an image forming method with use thereof. The label sheet of the present invention can prevent problems such as label sheet winding around a fuser and marks of winding produced on printing. Moreover, it prevents other problems such as appearance of curls of printed matters, edge folds caused by appearance of significant curls, toner cracks of printed matters generated by changes of temperature and humidity and the like.

The above object is achieved by the present invention described hereinafter. According to a first aspect of the present invention, there is provided a label sheet for electrophotography, the label sheet comprising: a label body including a label base member and an adhesive layer disposed on one surface of the label base member, the label base member including a resin film; and a separator including at least a separator base member, the separator base member including a resin film, the separator being releasably bonded to the adhesive layer, and the separator including a stiffness B, as determined by the following formula (2), of at least 0.21 N·mm:

$$B = E \cdot t^3 \qquad \text{Formula (2)}$$

in which E represents tensile elasticity in $N/mm^2$ of the separator at 135° C., and t represents thickness in mm of the separator at 23° C., 50% relative humidity, wherein the separator further includes a thermal shrinkage rate in an MD direction thereof, when subjected to heat treatment at 150° C. for 5 minutes, of S % and the label body further includes a thermal shrinkage rate in an MD direction thereof, when subjected to heat treatment at 150° C. for 5 minutes, of L %, such that a thermal shrinkage difference A as determined by the following formula (1):

$$A = S - L \qquad \text{Formula (1)}$$

is in the range −0.3% to 0.1%.

In the label sheet for electrophotography, a toner image receiving layer containing a thermoplastic resin having a storage elastic modulus in the range of 4 Pa to 250 Pa at 130° C. may be formed on a surface of the label base member opposite to the surface provided with the adhesive layer.

Further, the label sheet for electrophotography may comprises the toner image receiving layer which contains a releasing agent in the range of 1 weight % to 10 weight %.

According to a second aspect of the present invention, there is provided a method for forming an image, the method comprising the steps of: providing a label sheet for electrophotography, the label sheet including a label body which includes a label base member and an adhesive layer disposed on one surface of the label base member, and a separator which includes at least a separator base member, the label base member including a resin film, the separator base member including a resin film, the separator being releasably bonded to the adhesive layer, and the separator including a stiffness B, as determined by the following formula (2), of at least 0.21 N·mm:

$$B = E \cdot t^3 \qquad \text{Formula (2)}$$

in which E represents tensile elasticity in $N/mm^2$ of the separator at 135° C., and t represents thickness in mm of the separator at 23° C., 50% relative humidity; forming a toner image with toner on the label body of the label sheet; and fixing the toner image to the label body of the label sheet, including melting the toner by heat, wherein the separator has a thermal shrinkage rate in an MD direction thereof, when subjected to heat treatment at 150° C. for 5 minutes, of S % and the label body has a thermal shrinkage rate in an MD direction thereof, when subjected to heat treatment at 150° C. for 5 minutes, of L %, such that a thermal shrinkage difference A as determined by the following formula (1):

$$A = S - L \qquad \text{Formula (1)}$$

is in the range −0.3% to 0.1%.

The fixing step may be carried out using a belt-type fixing device.

Furthermore, the fixing step may be a step where fixing treatment is conducted two times and the second fixing treatment is performed by using a belt-type fixing device.

DETAILED DESCRIPTION OF THE PREFERRED EMBODIMENTS

The preferred embodiments of the present invention are divided into two parts of a label sheet for electrophotography (often referred to as "label sheet" hereinafter) and an image forming method, and will be described below in detail.

(Label Sheet for Electrophotography)

Figure 1:
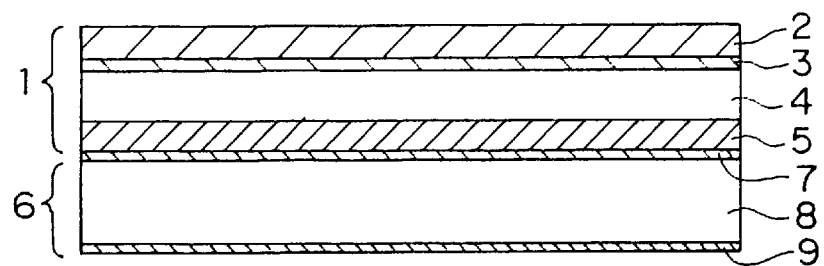
FIG. 1 is a typical cross sectional view showing a structure of a label sheet for electrophotography of the present invention.

FIG. 1 is a typical cross sectional view showing a structure of a label sheet for electrophotography of the present invention. The label sheet of the present invention is composed of a label body 1 provided with an adhesive layer 5 on one surface of label base member 4 and a separator 6 having at least a separator base member 8 temporarily adhered to the adhesive layer 5 in a releasable manner.

Further, in the label body 1, a toner image receiving layer 2 may be provided on a surface of the label base member 4 opposite to the surface provided with the adhesive layer 5. Furthermore, an anchor coating layer 3 may be provided between the label base member 4 and the toner image receiving layer 2.

For the separator 6, a release layer 7 or an antistatic treatment layer 9 may further be provided on one surface of the separator base member 8. Alternatively, the release layer 7 may be provided on one surface of the separator base member 8 and the antistatic layer 9 on the other surface thereof, respectively. It should be noted that when the label body 1 and the separator 6 are temporarily adhered to each other in a releasable manner to make a label sheet, the release layer 7 is arranged to come in contact with the adhesive layer 5 and the antistatic layer 9 is arranged to a surface outside of the label sheet.

The label sheet for electrophotography of the present invention is characterized in that both the label base member 4 and the separator base member 8 are made of a resin film, difference A between thermal shrinkage rates in an MD direction of the label body 1 and the separator base member 8 represented by the following formula (1) is in the range of −0.3% to 0.1%, and stiffness B of the separator 6 represented by the following formula (2) is 0.21 N·mm or more:
Formula (1)

$$A = S - L$$

wherein, S represents a thermal shrinkage rate (%) in the MD direction of the separator 6 after heat treatment for 5 minutes at 150° C., and L represents a thermal shrinkage rate in the MD direction of the label body 1 after heat treatment for 5 minutes at 150° C.:
Formula (2)

$$B = E \cdot t^3$$

wherein, E represents a tensile elasticity rate (N/mm$^2$) at 135° C. of the separator 6, and t represents a thickness (mm) of the separator 6 at 23° C. under the condition of 50% R.H.

A resin film is used as a material for the label base member 4. The resin film is not particularly limited, but films such as polyethylene terephthalate, polyethylene naphthalate, polycarbonate, polypropylane, polyimide, polystyrene and the like may be listed. Further, for the label base member 4, it is preferable that a resin film shrunk thermally by heat pre-treatment is used.

A resin film is used as a material for the separator base member 8. The resin film is not particularly limited, but films such as polyethylene terephthalate, polyethylene naphthalate, polycarbonate, polypropylane, polyimide, polystyrene and the like may be listed. Further, fillers or the like may be combined with these resin films. It is preferable for resin films to have a heat resistance of 100° C. or more. Furthermore, it is preferable for the separator base member 8 to be made of a resin film shrunk thermally by heat pre-treatment.

The label sheet of the present invention can prevent appearance of curls because both the label base member 4 and the separator base member 8 are made of a resin film, which does not allow the label sheet to expand and shrink to a significant degree upon change of temperature and humidity. The label sheet of the present invention can also prevent toner cracks from being produced.

It is preferable that the difference A between the thermal shrinkage rates in the MD direction is in the range of −0.3% to 0.1% and more preferably it is in the range of −0.2 to 0.0%.

When the difference A between the thermal shrinkage rates in the MD direction exceeds 0.1%, the label sheet after fixing easily curves circularly in such a manner as the face of the image side (when the toner image receiving layer 2 is formed, the face is the toner image receiving layer 2 side) bends inward and produces large curls. Accompanied by the appearance of such curls, troubles such as edge folds, fuser winding and the like of the label sheet occur. On the other hand, when the difference A between the thermal shrinkage rates in the MD direction is less than −0.3%, the label sheet after fixing easily curves circularly in such a manner as the face of the image side bends outward and produces large curls. Further, when the appearance of such curls occurs to a significant degree, problems such as edge folds and the like arise.

A thermal shrinkage rate S in the MD direction of the separator 6 after heat treatment for 5 minutes at 150° C. (referred to as "thermal shrinkage rate S" hereinafter) and a thermal shrinkage rate L in the MD direction of the label body 1 after heat treatment for 5 minutes at 150° C. (referred to as "thermal shrinkage rate L" hereinafter) are each determined after detaching the label body 1 and the separator 6 of the label sheet therefrom, followed by measuring their respective thermal shrinkage rates in the MD direction of the label body 1 and the separator 6 after heat treatment for 5 minutes at 150° C. on the basis of JIS K7133.

Figure 2:
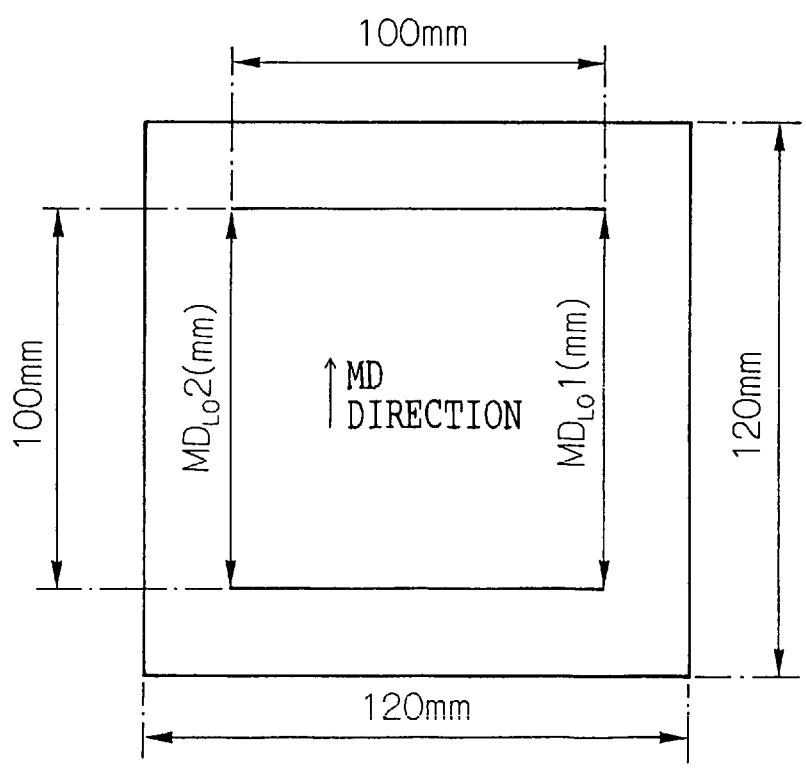
FIG. 2 is a dimension diagram of a test sample piece for measurement of thermal shrinkage rate for determination of difference in the thermal shrinkage rates of the label sheet for electrophotography of the present invention.

Measurement of the thermal shrinkage rate S and the thermal shrinkage rate L is specifically described hereinafter. First, the MD direction of the fabricated label sheet is confirmed and the label sheet is cut off in 120 mm square. After that, the piece is left in a room at constant temperature of 23° C. and humidity of 50% R.H. for 1 hour. A one hundred mm square of marks which are used to measure the lengths before and after heat treatment are drawn on both the surface and the back surface of the cut off label using the dimension diagram of a test piece for measurement of the thermal shrinkage rates. The diagram shown in FIG. 2 is specifically prepared for determination of the difference between thermal shrinkage rates for the label sheet for electrophotography of the present invention. Dimensions in the MD direction ($MD_{LO}1$, $MD_{LO}2$) of the drawn mark are measured accurately before heating. After the measurement, the label body 1 is peeled off from the separator 6 of the label sheet and the both are heated at 150° C. for 5 minutes in a ventilated oven. Then, they are further left standing to be cooled in a room at constant temperature of 23° C. and humidity of 50% R.H. Next, dimensions in the MD direction ($MD_L1L$, $MD_L2L$) of the label body 1 and dimensions in the MD direction ($MD_L1S$, $MD_L2S$) of the separator 6 after the heat treatment are measured.

It should be noted that the MD direction is a flow direction of a machine at the time of fabrication of a label base member or separator base member.

Next, using the dimension values in the MD direction measured before and after the heat treatment described above, thermal shrinkage rate S and the thermal shrinkage rate L are determined by the following formulae (3) and (4) respectively as an average value in percentage for the dimensions in the MD direction ($MD_{LO}1$, $MD_{LO}2$).
Formula (3)

$$S = \{[(MD_L1S - MD_{LO}1)/MD_{LO}1 + (MD_L2S - MD_{LO}2)/MD_{LO}2]/2\} \times 100(\%)$$

Formula (4)

$$L = \{[(MD_L1L - MD_{LO}1)/MD_{LO}1 + (MD_L2L - MD_{LO}2)/MD_{LO}2]/2\} \times 100(\%)$$

Accordingly, the difference A between the thermal shrinkage rates in the MD direction is obtained by Formula (1) described above, that is, A =S−L.

It should be noted that when the values of the thermal shrinkage rate S and the thermal shrinkage rate L are negative, these values correspond to shrinkage of the label body 1 and the separator 6. When these values are positive, they correspond to expansion of the label body 1 and the separator 6.

The stiffness B of the separator 6 is preferably 0.21 N·mm or more and more preferably 0.26 N·mm or more. When the stiffness B of the separator 6 is less than 0.21 N·mm, the stiffness becomes poorer when heated at the time of fixing. For this reason, problems arise such that the label sheet is wound around the fuser, curls are produced or whereby edge folds are produced.

A method of calculating the stiffness B of the separator 6 is described hereinafter. The label body 1 and the separator 6 of the manufactured label sheet are released from each other. Next, a piece of the separator cut in a size of 10 mm width×150 mm length is set on a test chuck of an extension tester placed in a room with a constant temperature. After the piece is left in such a state for about 1 hour in the room with a constant temperature of 135° C., a rate of the tensile elasticity E (N/mm$^2$) of the separator at 135° C. is determined by performing an extension measurement at an extension speed of 300 mm/min. The stiffness B, that is, E·t$^3$ (N·mm) of the separator represented by Formula (2) described above is calculated by multiplying this tensile elasticity rate E (N/mm$^2$) at 135° C. by the thickness (mm) at 23° C. under the condition of 50% R.H. cubed.

As it has been described, in the label sheet for electrophotography of the present invention, (1) both the label base member 4 and the separator base member 8 are made of a resin film, (2) the difference A between the thermal shrinkage rates in the MD direction of the label body 1 and the separator 6 are in the range of −0.3% to 0.1%, and (3) the stiffness B of the separator 6 is 0.21 N·mm or more.

Therefore, it is possible to prevent the label sheet from winding around the fuser and marks of winding from being produced at the time of printing. Further, it is also possible to prevent problems of curls and edge folds causing significant curls of a printed matter, toner cracks of a printed matter produced by changes of temperature and humidity and the like, from arising.

These effects can be appeared notable by combining the above elements of (1) to (3).

In the label sheet of the present invention, it is preferable that the toner image receiving layer 2 containing a thermal plastic resin having at least a storage elastic modulus in the range of 4 Pa to 250 Pa at 130° C. is formed on a surface of the label base member 4 opposite to the surface provided with the adhesive layer 5.

By inclusion of the thermoplastic resin in the toner image receiving layer 2, it is possible for toner to be loaded inside of the toner image receiving layer 2 when the toner is heat-melted at the time of fixing. Accordingly, it is able to eliminate the inequality on the surface of the printed matter caused by toner and to make the image gloss uniform. Further, by inclusion of a releasing agent in the toner image receiving layer 2, releasability is provided, thereby making prevention of an off-setting phenomenon, fuser winding and the like possible.

As a thermoplastic resin, for example, polystyrene resin, styrene-vinyl acetate resin, acrylate resin, styrene-acrylic ester resin, styrene-methacrylic ester resin, polyurethane resin, polyester resin and the like may be listed. Further, as a releasing agent, carnauba wax, rice wax, candelilla wax, paraffin wax, olefin wax, and the like may be listed.

The storage elastic modulus of the thermoplastic resin at 130° C., 10 rad/sec is preferably in the range of 4 Pa to 250 Pa, and is more preferably in the range of 4 Pa to 100 Pa. When the storage elastic modulus is less than 4 Pa, the thermoplastic resin is softened too much when heated at the time of fixing, which may facilitate an off-setting phenomenon and fuser winding to be produced.

On the other hand, when the storage elastic modulus exceeds 250 Pa, the property of toner loading into the toner image receiving layer 2 deteriorates. For this reason, the uniformity of the image gloss may become poor. It should be noted that the measurement of the storage elastic modulus was evaluated using DYNAMIC ANALYZER RDAII by Leometrix Co.

In the label sheet for electrophotography of the present invention, the toner image receiving layer 2 preferably contains a releasing agent in the range of 1 weight % to 10 weight %, and more preferably in the range of 1 weight % to 5 weight %.

When the content of the releasing agent contained in the toner image receiving layer 2 is less than 1 weight %, the releasability of the label sheet from the fuser decreases when fixing. For this reason, the label sheet may be wound around the fuser. On the other hand, when the content exceeds 10 weight %, the uniformity of the image gloss may decrease. It should be noted that a releasing effect of a releasing agent varies depending on kinds of releasing agents. Therefore, it is preferable to adjust the content according to the kinds of the releasing agents.

The thickness of the toner image receiving layer 2 is preferably in the range of 3 μm to 15 μm, and more preferably in the range of 4 μm to 10 μm. When the thickness is thinner than 3 μm, the loading property of the toner may become poorer and the uniformity of the image gloss may also become poorer. When the thickness exceeds 15 μm, an off-setting phenomenon and fuser winding of the label sheet may sometimes be facilitated to occur to be produced when heated at the time of fixing.

It is preferable to add a variety of surfactants, metallic oxide powders and the like to the toner image receiving layer 2 in order to enhance toner transferability. Further, it is preferable that a logarithmic value of the surface electrical resistance rate (Ω) of the toner image receiving layer 2 is in the range of 7.0 to 9.5 at 28° C. under an atmosphere of 85% R.H. and 10.8 to 12.0 at 10° C. under an atmosphere of 15% R.H.

It is preferable that the resin film used for label base member 4 is mixed with fillers such as titanium dioxide, calcium carbonate and the like in order to suppress the thermal shrinkage of the label body 1 when heated at the time of fixing and to control whiteness. Further, it is preferable that when the toner image receiving layer 2 is provided on the label base member 4, the surface of the label base member 4 is treated by corona discharge or the anchor coating layer 3 made of materials such as polyurethane type, water base resin type, vinyl acetate type, acrylic type and the like is provided between the label base member 4 and the toner image receiving layer 2, in order to enhance adhesiveness of the surface to the thermoplastic resin constituting toner image receiving layer 2. The thickness of anchor coating layer 3 is preferable to be in the range of 0.1 μm to 2.0 μm.

The thickness of the label base member 4 is preferable to be in the range of 25 μm to 150 μm, and more preferable to be in the range of 40 μm to 100 μm. When the thickness is thinner than 25 μm, handling of the label body 1 may become difficult after the label body 1 has been released from the label sheet. On the other hand, when the thickness exceeds 150 μm, transferability may sometimes become poor at the time of transferring a toner image to the label body of the label sheet when printing.

As the adhesive layer 5, adhesive such as acrylic type, rubber type and the like can be used. The coating thickness of the adhesive layer 5 is preferable to be in the range of 5 μm to 30 μm, and more preferable to be in the range of 10 μm to 20 μm. When the thickness exceeds 30 μm, the adhesive runs over the edge of the label sheet, which may pollute inside the copying machine or printer, giving rise to failed paper feeding or the like.

On the other hand, when the thickness is thinner than 5 μm, the adherence by which the label body 1 and the separator 6 are temporarily adhered to each other is insufficient in power. For this reason, the label body 1 and the separator 6 of the label sheet are released from each other in the side of copying machine or printer when printing, and moreover, the released label body 1 and/or separator 6 may adhere to members in side of the copying machine or printer, which may cause failed paper feeding.

It should be noted that the adhesive layer 5 is placed on one side of the label base member 4 in a separated state of the label sheet of the present invention. However, when the label sheet is manufactured, for example, the adhesive layer 5 may be formed on one side of the separator 6 (if the release layer 7 is provided on the separator 6, the adhesive layer 5 is formed on the release layer 7). Next, the side of the separator 6 provided with the adhesive layer 5 and one side of the label base member 4 where nothing is provided may be stuck together with each other to make a label sheet. In this case, at the time of separating the label sheet, the adhesive layer 5 is released from the separator 6 while the adhesive layer 5 remains adhering to the label base member 4.

The thickness of the separator base member 8 is preferable to be in the range of 25 μm to 150 μm, and more preferable to be in the range of 50 μm to 100 μm. When the thickness is thinner than 25 μm, it may occasionally become difficult to handle the label sheet. On the other hand, when the thickness exceeds 150 μm, transferability may become poorer at the time of transferring a toner image to the label body of the label sheet when printing.

When the release layer 7 is provided on one side of separator base member 8, the release layer 7 can be formed by coating with an ultraviolet curing-type silicon resin, a thermoplastic-type silicon resin or the like. The thickness of the release layer 7 is not particularly limited, but it is preferable to be in the range of 0.05 μm to 1 μm.

In order to enhance transferability of toner, it is preferable to provide the antistatic layer 9 on a surface opposite to the surface which is temporarily stuck with the label body 1. The antistatic layer 9 may contain a variety of surfactants, metallic oxide powders and the like. Further, the logarithmic value of the surface electrical resistivity (Ω) of the antistatic layer 9 is preferable to be in the range of 7.0 to 9.5 at 28° C. under the condition of 85% R.H, and is preferable to be in the range of 10.8 to 12.0 at 10° C. under the condition of 15% R.H. Furthermore, in order to secure running stability, it is preferable to provide treatment for making a surface rough such as sanding treatment and the like to a surface of the separator 6 opposite to the surface on which the label body 1 is temporarily stuck.

[Image Forming Method]

An image forming method of the present invention comprises a toner image forming step of forming a toner image with toner on a label body of the label sheet for electrophotography of the present invention described above; and a fixing step of fixing the toner image, characterized in that the fixing step is a step in which the toner is melted by heat for fixing.

Further, the image forming method of the present invention can use a belt-type fixing device in the fixing step.

Furthermore, in the image forming method of the present invention, the fixing step may include a step where fixing treatment is conducted two times and the second fixing treatment can be performed by using a belt-type fixing device.

Figure 3:
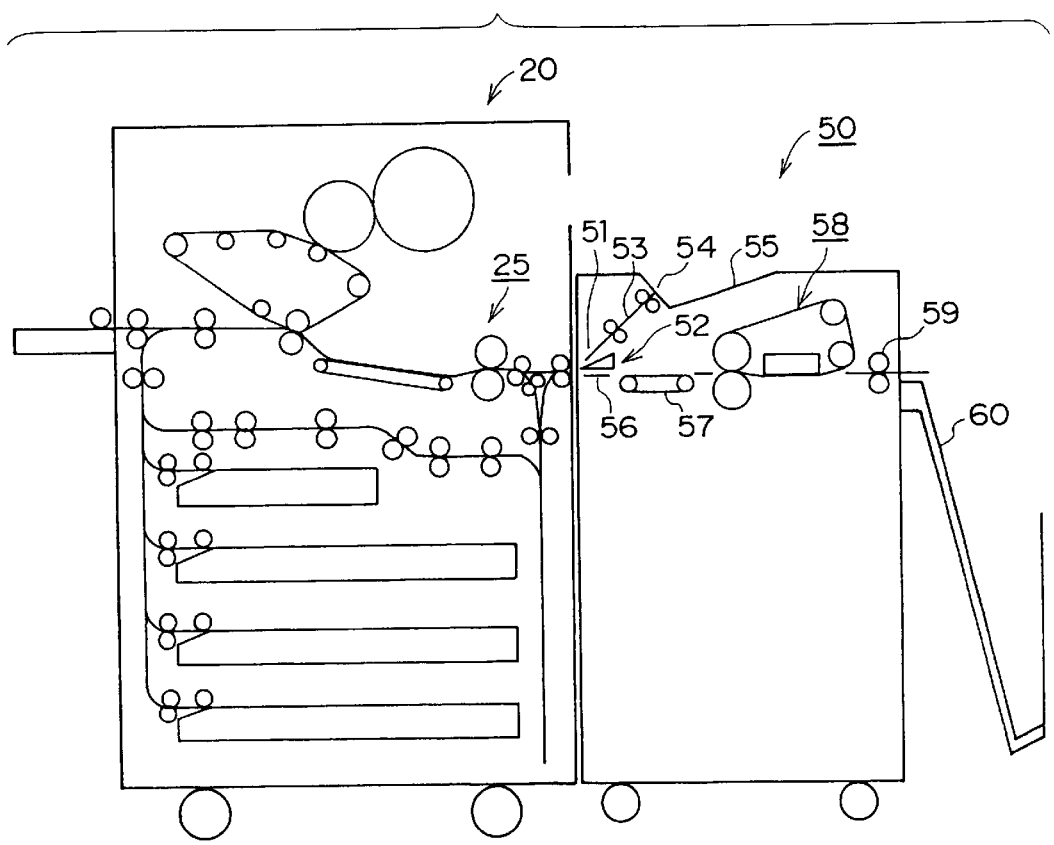
FIG. 3 is a schematic block diagram showing a preferable example of a color image forming apparatus used in an image forming method of the present invention.

FIG. 3 is a schematic block diagram showing a preferable example of a color image forming apparatus used for the image forming method of the present invention. The color image forming apparatus is composed of a color image forming apparatus main body 20 having a built-in fixing device 25 as illustrated on the left side of FIG. 3 and a secondary fixing unit 50 having a built-in belt-type fixing device 58 as illustrated on the right side of FIG. 3.

Explanation will be given to one example of the image forming method of the present invention performed using the color image forming apparatus 20, the fixing device 25 built in the color image forming apparatus 20, and the belt-type fixing device 58 built in the secondary fixing unit 50.

First of all, a toner image forming step of forming a toner image using toner on a label body of the label sheet for electrophotography is carried out in the color image forming apparatus main body 20. It should be noted that the toner image forming step comprises at least a latent image forming step in which a latent image is formed in a latent image holding body, a developing step in which the latent image is developed using a developer for electrophotography containing at least toner to obtain a toner image and a transferring step in which the developed toner image is transferred to the label body of the label sheet.

In the fixing step of fixing a toner image, the toner image is fixed by melting toner with heat on the fixing device 25 built in the color image forming apparatus main body 20. It should be noted that the fixing step may be carried out by using a fixing device having functions and structure equivalent to those of the belt-type fixing device 58 in place of the fixing device 25.

In this example, the fixing step comprises two steps of fixing treatment using the fixing device 25 and the secondary fixing unit 50. Further, the second fixing treatment is designed to be performed using the belt-type fixing device 58 built in the secondary fixing unit 50.

Next, each part constructing the secondary fixing device 50 and a carrying path of the label sheet when the second fixing treatment is conducted by the secondary fixing unit 50 will be described.

The secondary fixing unit 50 is provided with a feed port 51 fed with the label sheet for electrophotography discharged from the color image forming apparatus main body 20. A switch gate 52 to switch the carrying path of the label sheet is provided inside of this feed port 51.

When a label sheet discharged from the color image forming apparatus main body 20 is discharged onto a first discharge tray 55 placed outside without the second fixing treatment, the carrying path of the label sheet is switched to a first carrying path 53 situated upper by the switch gate 52. Accordingly, the label sheet is discharged onto the first discharge tray 55 by a discharge roll 54.

On the other hand, when the second fixing treatment is carried out to the label sheet discharged from main body 20 of color image forming apparatus, the switch gate 52 switches the carrying path of the label sheet to a second carrying path 56 situated lower, and the label sheet is carried to the belt-type fixing device 58 by a conveyor belt 57. The carried label sheet is subjected to fixing treatment by the belt-type fixing device 58 to be discharged onto a second discharge tray 60 by a discharge roll 59.

In the image forming apparatus as illustrated in FIG. 3, the second fixing treatment is carried out again by the belt-type fixing device 58 to the label sheet to which fixing treatment of a toner image in full colors has been carried out by the fixing device 25. It should be noted that the second fixing treatment by the belt-type fixing device 58 may be omitted by the operation of the switch gate 52.

Figure 4:
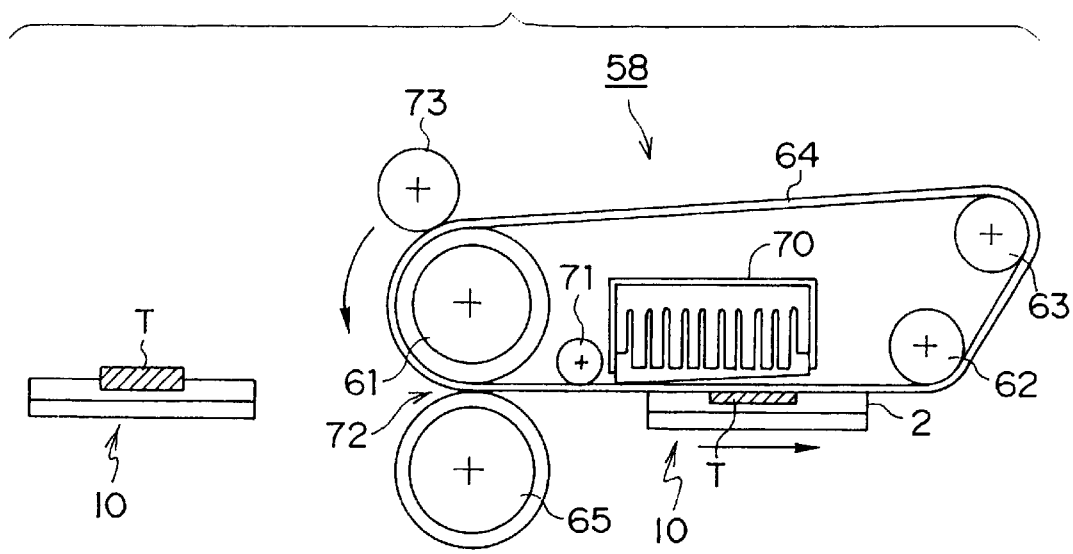
FIG. 4 is a typical cross sectional view of a belt-type fixing device built in a secondary fixing unit of the color image forming apparatus, shown in FIG. 3, used in the image forming method of the present invention.

Next, a structure of the belt-type fixing device 58 and fixing treatment carried out by the belt-type fixing device 58 will be described. FIG. 4 is a typical cross sectional view of a belt-type fixing device built in a secondary fixing unit of the color image forming apparatus (shown in FIG. 3) used for the image forming method of the present invention.

The main structure of the belt-type fixing device 58 may be composed of a heat roll 61, a release roll 62, a work control roll 63, a fixing belt 64 tightly wound around these three rolls to enable them to rotate and a pressure roll 65 press-contacted by pressure to the heat roll 61 via the fixing belt 64.

The fixing treatment is performed, wherein the label sheet of the present invention is made to pass through the portion press-contacted by a pressure portion 72 (nip portion) between the fixing belt 64 and the pressure roll 65 so that the toner image may face the fixing belt 64, and wherein the fixing is performed by heating and pressing the toner image so that the toner may be heat-melted. After the label sheet has been fixed at the portion press-contacted by the pressure portion 72, the label sheet is released from the fixing belt 64 in a state that the fixing belt 64 is cooled to some extent.

Figure 5:
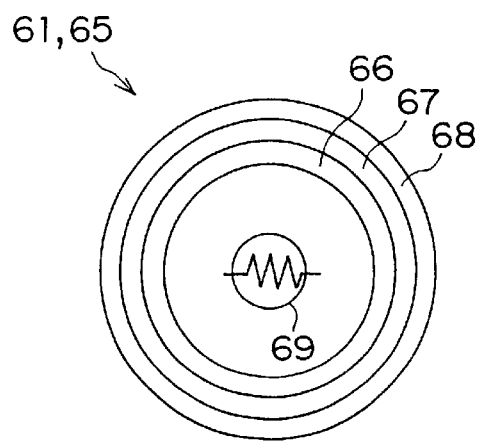
FIG. 5 is a typical cross sectional view of a heat roll or a pressure roll of the belt-type fixing device in the color image forming apparatus, shown in FIG. 4, used in the image forming method of the present invention.

Next, the structure and functions of each part of the belt-type fixing device 58 will be described in detail. FIG. 5 is a typical cross sectional view of a heat roll or a pressure roll of the belt-type fixing device (shown in FIG. 4) in the color image forming apparatus used for the image forming method of the present invention. The heat roll 61 is made to have a desirable outer diameter to be used after the surface of a metallic core 66 composed of, for example, aluminum, stainless steel or the like is coated with an elastic layer 67, in a thickness preferably in the range of 1 mm to 3 mm, made of silicon rubber or the like whose rubber hardness measured based on JIS K6253 is preferably in the range of 20° to 60°, followed by further coating of the surface of the elastic layer 67 with a release layer 68 made of PFA tube or the like.

A halogen lamp 69 having a calorific value preferably in the range of 300 W to 350 W is provided inside of this heat roll 61 as a heat source. The heat roll 61 is heated by the halogen lamp 69 to a predetermined surface temperature thereof (preferably in the range of 130° C. to 195° C.).

Further, as the pressure roll 65, a pressure roll constructed in a manner similar to the heat roll 61 shown in FIG. 5, for example, is used. The surface of the metallic core 66 made of aluminum, stainless steel or the like is coated with the elastic layer 67, in a thickness preferably in the range of 1 mm to 3 mm, made of silicon rubber or the like whose rubber hardness measured based on JIS K6253 is preferably in the range of 20° to 60°. Further, the surface of the elastic layer 67 is coated with the release layer 68 made of PFA tube or the like to be made to have the predetermined outer diameter for use.

The halogen lamp 69 having a calorific value preferably in the range of 300 W to 350 W is provided inside of this pressure roll 65 as a heat source. The pressure roll 65 is heated from its inside by the halogen lamp 69 to have the predetermined surface temperature thereof (preferably in the range of 85° C. to 155° C.). It should be noted that a heat source may be omitted from the pressure roll 65.

The heat roll 61 and the pressure roll 65 are constructed to be press-contacted by pressure to each other via the fixing belt 64 by pressure means (not shown) with nip pressure preferably in the range of 100 kPa to 200 kPa.

The fixing belt 64 is tightly wound around the three rolls composed of the heat roll 61, the release roll 62 and the work control roll 63 to enable them to rotate as described above, and is rotated by the heat roll 61 which is driven by a driving source (not shown) at the predetermined moving speed. As the fixing belt 64, a fixing belt having a constitution in which a silicon rubber layer with a thickness of 50 μm is coated on an endless film made of polyimide having a thickness of 80 μm is used.

Further, inner side of the fixing belt 64, a cooling heat sink 70 to forcibly cool the fixing belt 64 is arranged between the heat roll 61 and the release roll 62. The label sheet after fixing, firmly stuck to the fixing belt 64 is cooled by the cooling heat sink 70. At this event, the fixing belt 64 is cooled down to the range of 50° C. to 80° C. in the vicinity of the release roll 62.

It should be noted that a tension roll 71 with a small diameter to apply a constant tension to the fixing belt 64 is arranged between the cooling heat sink 70 and the heat roll 61 in the circle of the fixing belt 64.

Next, fixing treatment for the label sheet of the present invention performed by the belt-type fixing device 58 will be described in detail.

As shown in FIG. 4, a label sheet 10 to which a color toner image T has been transferred or which has received the first fixing treatment after the transfer passes through the portion press-contacted by the pressure portion 72 from left to right in FIG. 4. At this time of the event, the label sheet 10 is fed to the portion press-contacted by the pressure portion 72 with the color toner image T facing the heat roll 61. While the label sheet 10 passes through the portion press-contacted by the pressure portion 72, the color toner image T is melted with heat on the label sheet 10 to be fixed. At the same time, since the toner image receiving layer 2 formed on the surface of the label sheet 10 softened by being heated, the label sheet 10 becomes in a state of being stuck to the surface of the fixing belt 64.

Then, the label sheet 10 stuck to the surface of the fixing belt 64 is carried with the fixing belt 64 in the state of being stuck together. While being carried, owing to forced cooling of the fixing belt 64 by the heat sink for cooling 70, the toner image receiving layer 2 fixed with the color toner image T is also cooled down and hardened. At this event, the stiffness of the label sheet 10 is recovered by cooling. The label sheet 10 stuck to the fixing belt 64 is released from the fixing belt 64 by the release roll 62 because the stiffness of the label sheet 10 has been recovered. After the label sheet 10 is released from the fixing belt 64, the remaining toner and the like are cleared away from the surface of the fixing belt 64 by a cleaner 73, making it ready for the next fixing treatment.

For this reason, in the label sheet for electrophotography fixing-treated after the toner image transferred in the color image forming apparatus main body 20, when the fixing treatment is carried out by the fixing device 25 built in the color image forming apparatus main body 20, appearances of fuser winding and marks of winding are suppressed, and the height of curls of the label sheet and printed matter after the fixing treatment is low, resulting in no edge folds as well. Further, the uniformity of the image gloss of the printed matter obtained after the fixing treatment is excellent.

Furthermore, the image gloss of the label sheet 10 for electrophotography of the present inventions is made to be remarkably uniform because the toner image is further loaded into the image receiving layer by the second fixing treatment with the belt-type fixing device 58 after the fixing treatment with the fixing device 25. In addition to that, appearances of fuser winding and marks of winding of the label sheet 10 are suppressed at the time of the second fixing treatment, and the height of curls of the printed matter after the second fixing treatment is low, not allowing edge folds to be produced.

Additionally, even though the printed matter obtained after the fixing treatment with the fixing device 25 and the second fixing treatment as described above is left under the conditions of a high temperature and humidity, no toner cracks are produced. Hence, the label sheet for electrophotography and the image forming method with use thereof are extremely useful for practical use.

[EXAMPLES]

The present invention will be described more specifically with reference to examples hereinafter. It should be noted that the present invention is not limited to the following examples.

It should also be noted that the examples and comparative examples have been made to evaluate for such specific properties of the label sheet as uniformity of image gloss, height of curl, edge fold, fuser winding around the primary fuser, fuser winding around the secondary fuser, toner cracks of a printed matter after the secondary fixing at a high temperature and humidity, and toner fixability. The results of the evaluation are shown in Table 1 and Table 2.

[Example A1]

As a label base member, a polyethylene terephthalate film (white PET film A, thickness: 50 μm) in a roll shape, whose thermal shrinkage rate is reduced to −0.45% by heat pre-treatment is used. After the coating liquid prepared by mixing the main agent composed of polyurethane and the solution of a cross-linking agent in the weight ratio of the main agent to the solution of a cross-linking agent of 14.1:1.0 is coated over one surface of this label base member to have a thickness of 1.0 μm, the coated label base member is subjected to floating dry to form an anchor coating layer.

Next, by using a comma coater, the anchor coating layer is coated with the following coating liquid for a toner image receiving layer and dried to have a dry thickness of 7 μm to make a label body without an adhesive layer. Such a label body without having an adhesive layer is wound in a roll shape.

(Coating Liquid for Toner Image Receiving Layer)
- Surfactant (cation surfactant, ELEGAN 264-WAX; produced by NOF Corporation): 0.5 parts by weight
- Thermoplastic resin (polyester resin, storage elastic modulus: 4 Pa, TUFTONE NE382: produced by Kao Corporation): 10 parts by weight
- Releasing agent (RICE WAX, TOA-RO1: produced by Toa Kasei Co., Ltd.): 0.3 parts by weight
- Solvent (toluene): 90 parts by weight As a separator base member, a heat-resistant polyethylene terephthalate film Z (75 μm) whose thermal shrinkage is reduced by heat pre-treatment is used. The surface of one side of the separator base member is subjected to mat treatment by sanding and antistatic treatment and a silicone resin layer is provided as a release layer on a surface opposite to the surface subjected to the mat treatment and antistatic treatment to make a separator.

Next, by using a comma coater, the release layer provided on the separator is coated with an acrylic type adhesive solvent to have a dry thickness of 15 μm and dried to make an adhesive layer. Then, a surface of the separator provided with the adhesive layer and a surface which is not provided with an image receiving layer of the label body having no adhesive layer wound in the roll shape are stuck with each other not to introduce air into the adhesive layer by the use of an laminator, producing a label sheet for electrophotography of Example A1.

The stiffness B of the separator obtained in Example A1 is 0.21 N·mm. Further, the thermal shrinkage rate L of the label body and the thermal shrinkage rate S of the separator both obtained in Example A1 are −0.45% and −0.35%, respectively. Hence, the difference A between the thermal shrinkage rates in the MD direction is 0.1%.

[Example A2]

As a label base member, a polyethylene terephthalate film (white PET film B, thickness: 50 μm) in a roll shape, whose thermal shrinkage rate is reduced to −0.25% by heat pre-treatment is used. After the coating liquid prepared by mixing the main agent composed of polyurethane and the solution of a cross-linking agent in the weight ratio of the main agent to the solution of a-cross-linking agent of 14.1:1.0 is coated over one surface of this label base member to have a thickness of 1.0 μm, the coated label base member is subjected to floating dry to form an anchor coating layer.

Next, by using a comma coater, the anchor coating layer is coated with the same coating liquid for a toner image receiving layer as that used in Example A1 and dried to have a dry thickness of 3 μm to make a label body without an adhesive layer. Such a label body without having an adhesive layer is wound in a roll shape.

The same separator as that used for Example A1 is used and stuck to the label body in the same manner as that in Example A1 to produce a label sheet for electrophotography of Example A2.

The stiffness B of the separator obtained in Example A2 is 0.21 N·mm. Further, the thermal shrinkage rate L of the label body and the thermal shrinkage rate S of the separator both obtained in Example A2 are −0.25% and −0.35%, respectively. Hence, the difference A between the thermal shrinkage rates in the MD direction is −0.1%.

[Example A3]

As a label base member, a polyethylene terephthalate film (white PET film C, thickness: 50 μm) in a roll shape, whose thermal shrinkage rate is reduced to −0.05% by heat pre-treatment is used. After the coating liquid prepared by mixing the main agent composed of polyurethane and the solution of a cross-linking agent in the weight ratio of the main agent to the solution of a cross-linking agent of 14.1:1.0 is coated over one surface of this label base member to have a thickness of 1.0 μm, the coated label base member is subjected to floating dry to form an anchor coating layer.

Next, by using a comma coater, the anchor coating layer is coated with the coating liquid for a toner image receiving layer of Example A1 and dried to have a dry thickness of 7 μm to make a label body without an adhesive layer. Such a label body without having an adhesive layer is wound in a roll shape.

The same separator as that used in Example A1 is used except that a polyethylene terephthalate film X (75 μm) having heat resistance with reduced thermal shrinkage and increased tensile strength by heat pre-treatment is used as a separator.

Next, a label sheet for electrophotography of Example A3 is obtained by sticking the label body to the separator in the same steps as those performed in Example Al.

The stiffness B of the separator obtained in Example A3 is 0.27 N·mm. Further, the thermal shrinkage rate L of the label body and the thermal shrinkage rate S of the separator both obtained in Example A3 are −0.05% and −0.35%, respectively. Hence, the difference A between the thermal shrinkage rates in the MD direction is −0.3%.

[Example A4]

As a label base member, a polyethylene terephthalate film (white PET film A, thickness: 50 μm) in a roll shape, whose thermal shrinkage rate is reduced to −0.45% by heat pre-treatment is used. After the coating liquid prepared by mixing the main agent composed of polyurethane and the solution of a cross-linking agent in the weight ratio of the main agent to the solution of a cross-linking agent of 14.1:1.0 is coated over one surface of this label base member to have a thickness of 1.0 μm, the coated label base member is subjected to floating dry to form an anchor coating layer.

Next, by using a comma coater, the anchor coating layer is coated with the following coating liquid for a toner image receiving layer and dried to have a dry thickness of 7 μm to make a label body without an adhesive layer. Such a label body without having an adhesive layer is wound in a roll shape.

(Coating Liquid for Toner Image Receiving Layer)

Surfactant (cation surfactant, ELEGAN 264-WAX; produced by NOF Corporation): 0.5 parts by weight Thermoplastic resin (polyester resin, storage elastic modulus: 4 Pa, TUFTONE NE382: produced by Kao Corporation): 10 parts by weight Releasing agent (RICE WAX, TOA-RO1: produced by Toa Kasei Co., Ltd.): 1.0 parts by weight Solvent (toluene): 90 parts by weight The same separator as that used for Example A1 is used and stuck to the label body in the same manner as that in Example A1 to produce a label sheet for electrophotography of Example A4.

The stiffness B of the separator obtained in Example A4 is 0.21 N·mm. Further, the thermal shrinkage rate L of the label body and the thermal shrinkage rate S of the separator are −0.45% and −0.35%, respectively. Hence, the difference A between the thermal shrinkage rates in the MD direction is 0.1%.

[Example A5]

As a label base member, a polyethylene terephthalate film (white PET film A, thickness: 50 μm) in a roll shape, whose thermal shrinkage rate is reduced to −0.45% by heat pre-treatment is used. After the coating liquid prepared by mixing the main agent composed of polyurethane and the solution of a cross-linking agent in the weight ratio of the main agent to the solution of a cross-linking agent of 14.1:1.0 is coated over one surface of this label base member to have a thickness of 1.0 μm, the coated label base member is subjected to floating dry to form an anchor coating layer.

Next, by using a comma coater, the anchor coating layer is coated with the same coating liquid for a toner image receiving layer as that used in Example A1, and dried to have a dry thickness of 15 μm to make a label body without an adhesive layer. Such a label body without having an adhesive layer is wound in a roll shape.

The same separator as that used in Example A1 is used and stuck to the label body in the same manner as that in Example A1 to produce a label sheet for electrophotography of Example A5.

The stiffness B of the separator obtained in Example A5 is 0.21 N·mm. Further, the thermal shrinkage rate L of the label body and the thermal shrinkage rate S of the separator both obtained in Example A5 are −0.45% and −0.35%, respectively. Hence, the difference A between the thermal shrinkage rates in the MD direction is 0.1%.

[Example A6]

As a label base member, a polyethylene terephthalate film (white PET film A, thickness: 50 μm) in a roll shape, whose thermal shrinkage rate is reduced to −0.45% by heat pre-treatment is used. After the coating liquid prepared by mixing the main agent composed of polyurethane and the solution of a cross-linking agent in the weight ratio of the main agent to the solution of a cross-linking agent of 14.1:1.0 is coated over one surface of this label base member to have a thickness of 1.0 μm, the coated label base member is subjected to floating dry to form an anchor coating layer.

Next, by using a comma coater, the anchor coating layer is coated with the following coating liquid for a toner image receiving layer and dried to have a dry thickness of 7 μm to make a label body without an adhesive layer. Such a label body without having an adhesive layer is wound in a roll shape.

(Coating liquid for toner image receiving layer)

Surfactant (cation surfactant, ELEGAN 264-WAX; produced by NOF Corporation): 0.5 parts by weight Thermoplastic resin (polyester resin, storage elastic modulus: 4 Pa, TUFTONE NE 382): produced by Kao Corporation): 10 parts by weight Releasing agent (RICE WAX, TOA-RO1: by Toa Kasei Co., Ltd. ): 0. 1 parts by weight Solvent (toluene): 90 parts by weight The same separator as that used in Example A1 is used and stuck to the label body in the same manner as that in Example A1 to produce a label sheet for electrophotography of Example A6.

The stiffness B of the separator obtained in Example A6 is 0.21 N·mm. Further, the thermal shrinkage rate L of the label body and the thermal shrinkage rate S of the separator both obtained in Example A6 are −0.45% and −0.35%, respectively. Hence, the difference A between the thermal shrinkage rates in the MD direction is 0.1%.

[Example A7]

As a label base member, a polyethylene terephthalate film (white PET film B, thickness: 50 μm) in a roll shape, whose thermal shrinkage rate is reduced to −0.25% by heat pre-treatment is used. After the coating liquid prepared by mixing the main agent composed of polyurethane and the solution of a cross-linking agent in the weight ratio of the main agent to the solution of a cross-linking agent of 14.1:1.0 is coated over one surface of this label base member to have a thickness of 1.0 μm, the coated label base member is subjected to floating dry to form an anchor coating layer.

Next, by using a comma coater, the anchor coating layer is coated with the same coating liquid for a toner image receiving layer as that of Example A1 and dried to have a dry thickness of 7 μm to make a label body without an adhesive layer. Such a label body without having an adhesive layer is wound in a roll shape.

The same separator as that used in Example A1 is used except that a polyethylene terephthalate film Y (100 μm) having heat resistance with reduced thermal shrinkage by heat pre-treatment is used as a separator.

Next, a label sheet for electrophotography of Example A7 is produced by sticking the label body to the separator in the same manner as that of Example A1.

The stiffness B of the separator obtained in Example A7 is 0.70 N·mm. Further, the thermal shrinkage rate L of the label body and the thermal shrinkage rate S of the separator both obtained in Example A7 are −0.25% and −0.25%, respectively. Hence, the difference A between the thermal shrinkage rates in the MD direction is 0.0%.

[Example A8]

As a label base member, a polyethylene terephthalate film (white PET film B, thickness: 50 μm) in a roll shape, whose thermal shrinkage rate is reduced to −0.25% by heat pre-treatment is used. After the coating liquid prepared by mixing the main agent composed of polyurethane and the solution of a cross-linking agent in the weight ratio of the main agent to the solution of a cross-linking agent of 14.1:1.0 is coated over one surface of this label base member to have a thickness of 1.0 μm, the coated label base member is subjected to floating dry to form an anchor coating layer.

Next, by using a comma coater, the anchor coating layer is coated with the following coating liquid for a toner image receiving layer and dried to have a dry thickness of 7 μm to make a label body without an adhesive layer. Such a label body without having an adhesive layer is wound in a roll shape.

(Coating Liquid for Toner Image Receiving Layer)
  Surfactant (cation surfactant, ELEGAN 264-WAX; produced by NOF Corporation): 0.5 parts by weight
  Thermoplastic resin (polyester resin, storage elastic modulus: 250 Pa, FX test product T): 10 parts by weight
  Releasing agent (RICE WAX, TOA-RO1: produced by Toa Kasei Co., Ltd. ): 0.3 parts by weight
  Solvent (toluene): 90 parts by weight The same separator as that used in Example A1 is used except that the same separator base member as that of Example A7 is used.

Next, the label body and the separator are stuck with each other in the same manner as that in Example A1 to produce a label sheet for electrophotography of Example A8.

The stiffness B of the separator obtained in Example A8 is 0.70 N·mm. Further, the thermal shrinkage rate L of the label body and the thermal shrinkage rate S of the separator both obtained in Example A8 are −0.25% and −0.25%, respectively. Hence, the difference A between the thermal shrinkage rates in the MD direction is 0.0%.

[Example A9]

As a label base member, a polyethylene terephthalate film (white PET film A, thickness: 50 μm) in a roll shape, whose thermal shrinkage rate has been reduced to −0.45% by heat pre-treatment is used. After the coating liquid prepared by mixing the main agent composed of polyurethane and the solution of a cross-linking agent in the weight ratio of the main agent to the solution of a cross-linking agent of 14.1:1.0 is coated over one surface of this label base member to have a thickness of 1.0 μm, the coated label base member is subjected to floating dry to form an anchor coating layer.

Next, by using a comma coater, the anchor coating layer is coated with the same coating liquid for a toner image receiving layer as that of example A1 and dried to have a dry thickness of 2 μm to make a label body without an adhesive layer. Such a label body without having an adhesive layer is wound in a roll shape. The same separator as that of Example A1 is used and stuck to the label body in the same manner as that in Example A1 to produce a label sheet for electrophotography of Example A9.

The stiffness B of the separator obtained in Example A9 is 0.21 N mm. Further, the thermal shrinkage rate L of the label body and the thermal shrinkage rate S of the separator both obtained in Example A9 are −0.45% and −0.35%, respectively. Hence, the difference A between the thermal shrinkage rates in the MD direction is 0.1%.

[Example A10]

As a label base member, a polyethylene terephthalate film (white PET film A, thickness: 50 μm) in a roll shape, whose thermal shrinkage rate has been reduced to −0.45% by heat pre-treatment is used. After the coating liquid prepared by mixing the main agent composed of polyurethane and the solution of a cross-linking agent in the weight ratio of the main agent to the solution of a cross-linking agent of 14.1:1.0 is coated over one surface of this label base member to have a thickness of 1.0 μm, the coated label base member is subjected to floating dry to form an anchor coating layer.

Next, by using a comma coater, the anchor coating layer is coated with the following coating liquid for a toner image receiving layer and dried to have a dry thickness of 7 μm to make a label body without an adhesive layer. Such a label body without having an adhesive layer is wound in a roll shape.

(Coating Liquid for Toner Image Receiving Layer)
  Surfactant (cation surfactant, ELEGAN 264-WAX; produced by NOF Corporation): 0.5 parts by weight
  Thermoplastic resin (polyester resin, storage elastic modulus: 400 Pa, FX test product M): 10 parts by weight
  Releasing agent (RICE WAX, TOA-RO1: produced by Toa Kasei Co., Ltd.): 0.3 parts by weight
  Solvent (toluene): 90 parts by weight The same separator as that used in Example A1 is used. The label body and the separator are stuck with each other in the same manner as that of Example A1 to produce a label sheet for electrophotography of Example A10.

The stiffness B of the separator obtained in Example A10 is 0.21 N·mm. Further, the thermal shrinkage rate L of the label body and the thermal shrinkage rate S of the separator both obtained in Example A10 are −0.45% and −0.35%, respectively. Hence, the difference A between the thermal shrinkage rates in the MD direction is 0.1%.

[Example A11]

As a label base member, a polyethylene terephthalate film (white PET film A, thickness: 50 μm) in a roll shape, whose thermal shrinkage rate has been reduced to −0.45% by heat pre-treatment is used. After the coating liquid prepared by mixing the main agent composed of polyurethane and the solution of a cross-linking agent in the weight ratio of the main agent to the solution of a cross-linking agent of 14.1:1.0 is coated over one surface of this label base member to have a thickness of 1.0 μm, the coated label base member is subjected to floating dry to form an anchor coating layer.

Next, by using a comma coater, the anchor coating layer is coated with the same coating liquid for a toner image receiving layer as that of example A1 and dried to have a dry thickness of 17 μm to make a label body without an adhesive layer. Such a label body without having an adhesive layer is wound in a roll shape.

The same separator as that of Example A1 is used and stuck to the label body in the same manner as that in Example A1 to produce a label sheet for electrophotography of Example A11.

The stiffness B of the separator obtained in Example A11 is 0.21 N·mm. Further, the thermal shrinkage rate L of the label body and the thermal shrinkage rate S of the separator both obtained in Example A11 are −0.45% and −0.35%, respectively. Hence, the difference A between the thermal shrinkage rates in the MD direction is 0.1%.

[Example A12]

As a label base member, a polyethylene terephthalate film (white PET film A, thickness: 50 μm) in a roll shape, whose thermal shrinkage rate has been reduced to −0.45% by heat pre-treatment is used. After the coating liquid prepared by mixing the main agent composed of polyurethane and the solution of a cross-linking agent in the weight ratio of the main agent to the solution of a cross-linking agent of 14.1:1.0 is coated over one surface of this label base member to have a thickness of 1.0 μm, the coated label base member is subjected to floating dry to form an anchor coating layer.

Next, by using a comma coater, the anchor coating layer is coated with the same coating liquid for a toner image receiving layer as that of example A1 except that the amount of the releasing agent in the coating liquid for toner image receiving layer is set to 1.2 parts by weight, and dried to have a dry thickness of 7 μm to make a label body without an adhesive layer. Such a label body without having an adhesive layer is wound in a roll shape. The same separator as that of Example A1 is used and stuck to the label body in the same manner as that in Example A1 to produce a label sheet for electrophotography of Example A12.

The stiffness B of the separator obtained in Example A12 is 0.21 N·mm. Further, the thermal shrinkage rate L of the label body and the thermal shrinkage rate S of the separator both obtained in Example A12 are −0.45% and −0.35%, respectively. Hence, the difference A between the thermal shrinkage rates in the MD direction is 0.1%.

[Example A13]

A label sheet for electrophotography of Example A13 is produced in the same manner as that of Example A1 except that a toner image receiving layer is not provided.

[Comparative Example A1]

The same label body as that of Example A1 is used as a label body. Further, as a separator base member, a polyethylene terephthalate film W (75 μm) having heat resistance, and whose thermal shrinkage has been reduced by heat pre-treatment is used. The surface of one side of the separator base member is subjected to mat treatment by sanding and antistatic treatment and a silicone resin layer is provided as a release layer on the surface opposite to the surface subjected to the mat treatment and antistatic treatment to make a separator. Next, in the same manner as that of Example A1, the label body and the separator are stuck with each other to produce a label sheet for electrophotography of Comparative Example A1.

The stiffness B of the separator obtained in Comparative example A1 is 0.14 N·mm. Further, the thermal shrinkage rate L of the label body and the thermal shrinkage rate S of the separator both obtained in Comparative example A1 are −0.45% and −0.35, respectively. Hence, the difference A between the thermal shrinkage rates in the MD direction is 0.1%.

[Comparative Example A2]

As a label base member, a polyethylene terephthalate film (white PET film D, thickness: 50 μm) in a roll shape without heat pre-treatment is used. After the coating liquid prepared by mixing the main agent composed of polyurethane and the solution of a cross-linking agent in the weight ratio of the main agent to the solution of a cross-linking agent of 14.1:1.0 is coated over one surface of this label base member to have a thickness of 1.0 μm, the coated label base member is subjected to floating dry to form an anchor coating layer.

Next, by using a comma coater, the anchor coating layer is coated with the same coating liquid for a toner image receiving layer as that of Example A1 and dried to have a dry thickness of 7 μm to make a label body without an adhesive layer. Such a label body without having an adhesive layer is wound in a roll shape.

The same separator as that of Example A1 is used as a separator base member except that a polyethylene terephthalate film W (75 μm) having heat resistance, and whose thermal shrinkage has been reduced by heat pre-treatment is used.

Next, in the same steps as those in Example A1, the label body and the separator are stuck with each other to produce a label sheet for electrophotography of Comparative Example A2.

The stiffness B of the separator obtained in Comparative example A2 is 0.14 N·mm. Further, the thermal shrinkage rate L of the label body and the thermal shrinkage rate S of the separator both obtained in Comparative example A2 are −0.75% and −0.35%, respectively. Hence, the difference A between the thermal shrinkage rates in the MD direction is 0.4%.

[Comparative Example A3]

The same label body as that of Comparative example A2 is used as a label body. Further the same separator as that of Example A3 is used. Next, in the same steps as those in Example A1, the label body and the separator are stuck with each other to produce a label sheet for electrophotography of Comparative Example A3.

The stiffness B of the separator obtained in Comparative example A3 is 0.27 N·mm. Furthermore, the thermal shrinkage rate L of the label body and the thermal shrinkage rate S of the separator both obtained in Comparative example A3 are −0.75% and −0.35%, respectively. Hence, the difference A of the shrinkage rates in the MD direction is 0.4%.

[Comparative Example A4]

The same label body as that of Example A3 is used. Further, the same separator as that of Example A1 is used as a separator except that a polyethylene terephthalate film W (75 μm) having heat resistance without heat pre-treatment is used. Next, in the same steps as those of Example A1, the label body and the separator are stuck with each other to produce a label sheet for electrophotography of Comparative example A4.

The stiffness B of the separator obtained in Comparative example A4 is 0.21 N·mm. The thermal shrinkage rate L of the label body and the thermal shrinkage rate S of the separator both obtained in Comparative example A4 are −0.05% and −0.5%, respectively. Hence, the difference A of the thermal shrinkage rates in the MD direction is 0.45%.

[Comparative example A5]

As a label base member, coat paper for printing in a roll shape having a basis weight of 104.7 g/m² is used. After the coating liquid prepared by mixing the main agent composed of polyurethane and the solution of a cross-linking agent in the weight ratio of the main agent to the solution of a cross-linking agent of 14.1:1.0 is coated over one surface of this label base member to have a thickness of 1.0 μm, the coated label base member is subjected to floating dry to form an anchor coating layer.

Next, by using a comma coater, the anchor coating layer is coated with the following coating liquid for a toner image receiving layer and dried to have a dry thickness of 1 μm to make a label body without an adhesive layer. Such a label body without having an adhesive layer is wound in a roll shape.

(Coating Liquid for Toner Image Receiving Layer)
- Surfactant (cation surfactant, ELEGAN 264-WAX; produced by NOF Corporation): 0.5 parts by weight
- Thermoplastic resin (polyester resin, storage elastic modulus: 4 Pa, TUFTONE NE382: produced by Kao Corporation): 10 parts by weight
- Releasing agent (RICE WAX, TOA-RO1: by Toa Kasei Co., Ltd.): 0.3 parts by weight
- Solvent (toluene): 90 parts by weight As a separator, one surface of high quality paper is laminated with a polyethylene (PE) film and a silicon resin layer is provided on the above laminated surface as a release layer. Further, releasable paper (basis weight 98 g/m²) coated with water-soluble paint containing calcium carbonate is employed for the side opposite to the laminated surface.

Next, with the use of a comma coater, an acrylic adhesive solution is coated on the release layer provided on the separator and dried to have a dry thickness of 15 μm, thus providing an adhesive layer. After this, the surface provided with the adhesive layer of the separator and the surface on which no image receiving layer of the label body wound in a roll shape has been formed, are stuck together not to introduce air into the adhesive layer by the use of an laminator, producing a label sheet for electrophotography of Comparative example A5.

[Comparative Example A6]

A label sheet for electrophotography of Comparative example A6 is obtained in the same manner as that of Comparative example A5 except that the label body of Comparative example A1 is used.

[Quality Evaluation Method]

A toner image is transferred to the label sheet for electrophotography of fabricated as described above in the Examples and Comparative examples using a color printer (DCC 500: made by Fuji Xerox Co., Ltd.) having the same structure as that of the image forming apparatus illustrated in FIG. 3 at a constant temperature and humidity (22° C., 55% R.H.). Further, after the first fixing treatment is carried out in thick paper 2 mode of the printer driver of the color printer, the second fixing treatment is carried out by the belt-type fixing device 58 at a belt running speed of 52 mm/s and a nip pressure of 120 kPa under the condition that the surface temperature of the heat roll 61 and the pressure roll 65 is raised to 170° C.

The label sheet for electrophotography obtained after the fixing treatment is evaluated with respect to gloss uniformity of a toner image, height of curl, toner fixability, edge fold, and toner crack at high temperature and humidity as well as presence of troubles of winding around the primary fuser (equivalent to the fixing device 25) and the secondary fuser (equivalent to the belt-type fixing device 58) at the time of printing. The results of evaluation are shown in Table 1A, Table 1B and Table 2.

[Evaluation of Image Gloss Uniformity]

A chart having primary color of yellow, magenta and cyan respectively, secondary color of red, green and blue respectively, and tertiary colors of yellow, magenta and cyan respectively and also having a dots area rate widely distributing among 0 to 100% is employed to evaluate a printed image. Visual evaluation is carried out on the following evaluation reference.
○: Excellent without unevenness of gloss. No problem for practical application.
○-: Good with inconsiderable unevenness of gloss. No problem for practical application.
Δ: Slightly poor with some unevenness of gloss. Problems for practical application.
X: Poor with significant unevenness of gloss. Problems for practical application.

[Evaluation of Curl Height]

Figure 6:
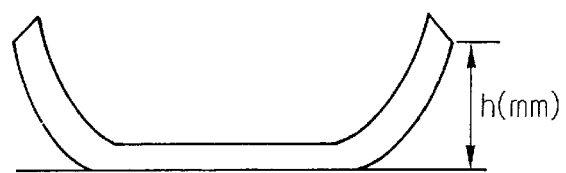
FIG. 6 is a typical cross sectional view defining curl height h after the label sheet for electrophotography of the present invention is discharged.
Figure 7:
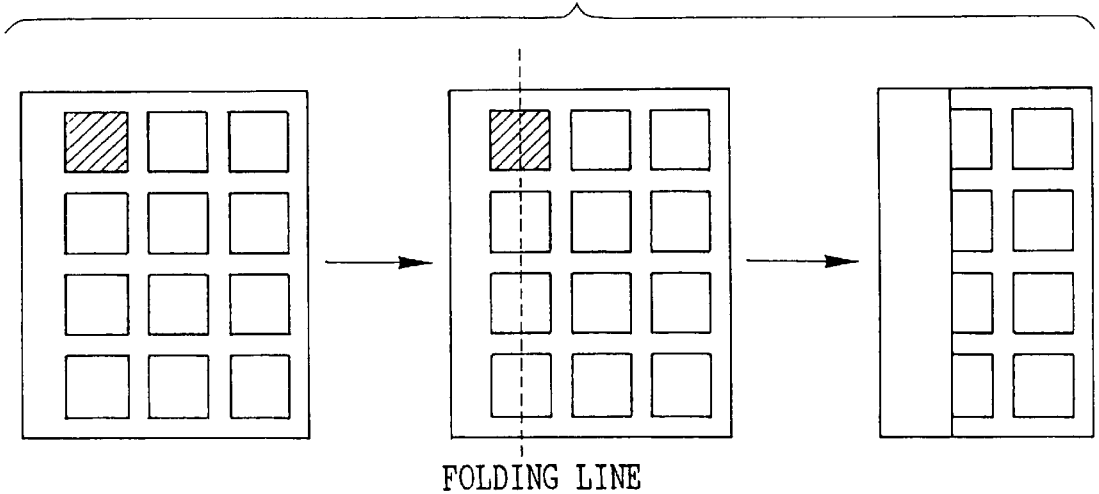
FIG. 7 is a schematic diagram to explain a method of evaluating toner fixability on the label sheet for electrophotography of the present invention.

After fixing treatment is carried out with the fixing device 25 and further, the second fixing treatment is carried out with the belt-type fixing device 58, the discharged label sheet is immediately moved to a flat place. After left standing for one minute, curl height h (mm) is measured from the flat point using a caliper as illustrated in FIG. 6. It should be noted that the curl height h is measured on the basis of the typical cross sectional view defining the curl height h shown in FIG. 6 after discharge of the label sheet for electrophotography of the present invention.

In the evaluation of the curl height h, the maximum values of the curl height h of four corners of each label sheet are determined for the five label sheets printed out consecutively and the obtained maximum values are averaged for the evaluation.

It is judged that if the curl height h is within plus or minus 15 mm, the label sheet had no problem for practical application and that if the curl height h exceeded plus or minus 15 mm, the label sheet had problems for practical application. A positive value (+) of the curl height h indicates that curl is present on a surface of the image side (a surface with the toner image receiving layer 2 if it is formed) and a negative value (−) indicates that curl is present on a surface opposite to the image side (a surface with the toner image receiving layer 2 if it is formed).

[Confirmation of Winding Around Fuser]

Immediately after a label sheet is discharged from the primary fuser (fixing device 25), it is visually confirmed whether or not winding around fuser appeared. Further, it is visually confirmed whether or not parts of uneven gloss owing to failed release from the fuser exist. In addition, it is confirmed whether or not winding around fuser appears in the secondary fixing device (belt-type fixing device 58).
○: No winding around fuser. No gloss unevenness owing to failed release from the fuser. No problem for practical application.
Δ: No winding around fuser. Appearance of gloss unevenness owing to failed release from the fuser. Problems for practical application.

X: Appearance of winding around fuser. Problems for practical application.

[Edge Fold]

It is visually confirmed whether or not there are parts of edge fold on the discharged label sheet in the direction of discharge.

○: No folds. No problem for practical application.

Δ: Slight folds. Problems for practical application.

X: Apparent folds. Folds remain on the label body after releasing the separator from the label sheet.

[Toner Fixability]

The label sheet formed with at least an image of a 2 cm by 2 cm square made with process black is folded at the site of square image toward the inner side. After a cylinder plumb having a width of 3 cm, a diameter of 5 cm and a weight of 470 g is rolled over the fold and the fold is opened, extent of peeling of the toner is confirmed by visual inspection and by touching with fingers.

○: No peeling.

Δ: Slight peeling but no problem for practical application.

X: Easily peeled off by slight touching.

[Toner Cracks at High Temperature and Humidity]

A toner image in a size of A4 is formed on a label sheet with at least an image of a 3.5 cm by 10 cm rectangle made with process black. Toner cracks on the rectangular image part are visually confirmed after the label sheet has been left standing for 16 hours or more at 28° C. under the condition of 85% R.H.

○: No cracks.

Δ: Slight but not conspicuous cracks. No problem for practical application.

X: Conspicuous cracks.

TABLE 1A

| | Examples | | | | | | |
|---|---|---|---|---|---|---|---|
| | Example A1 | Example A2 | Example A3 | Example A4 | Example A5 | Example A6 | Example A7 |
| Label base member | 50 μm White PET A | 50 μm White PET B | 50 μm White PET C | 50 μm White PET A | 50 μm White PET A | 50 μm White PET A | 50 μm White PET B |
| Separator base member | 75 μm Heat resistance PET Z | 75 μm Heat resistance PET Z | 75 μm Heat resistance PET X | 75 μm Heat resistance PET Z | 75 μm Heat resistance PET Z | 75 μm Heat resistance PET Z | 100 μm Heat resistance PET Y |
| Thickness of toner image receiving layer (μm) | 7 μm | 3 μm | 7 μm | 7 μm | 15 μm | 7 μm | 7 μm |
| Stored elasticity of thermoplastic resin (Pa) | 4 | 4 | 4 | 4 | 4 | 4 | 4 |
| Amount of releasing agent (weight %) | 3 | 3 | 3 | 10 | 3 | 1 | 3 |
| Thermal shrinkage rate L of label body (%) | −0.45 | −0.25 | −0.05 | −0.45 | −0.45 | −0.45 | −0.25 |
| Thermal shrinkage rate S of separator (%) | −0.35 | −0.35 | −0.35 | −0.35 | −0.35 | −0.35 | −0.25 |
| Difference A of thermal shrinkage rates in MD direction | 0.1 | −0.1 | −0.3 | 0.1 | 0.1 | 0.1 | 0.0 |
| Tensile elasticity rate of separator (N/mm²) at 135° C. | 500 | 500 | 650 | 500 | 500 | 500 | 700 |
| Thickness t of separator (mm) | 0.075 | 0.075 | 0.075 | 0.075 | 0.075 | 0.075 | 0.1 |
| Stiffness B of separator (N · mm) | 0.21 | 0.21 | 0.27 | 0.21 | 0.21 | 0.21 | 0.70 |
| Uniformity of image gloss | ○ | ○− | ○ | ○− | ○ | ○ | ○ |
| Height of curl h (mm) | 7 mm | −7 mm | −12 mm | 7 mm | 7 mm | 7 mm | 0 mm |
| Edge fold | ○ | ○ | ○ | ○ | ○ | ○ | ○ |
| Fuser winding around the primary fuser | ○ | ○ | ○ | ○ | ○ | ○ | ○ |
| Fuser winding around the secondary fuser | ○ | ○ | ○ | ○ | ○ | ○ | ○ |
| Toner crack of a printed matter at high temperature and humidity after second fixing | ○ | ○ | ○ | ○ | ○ | ○ | ○ |
| Toner fixability | ○ | ○ | ○ | ○ | ○ | ○ | ○ |

TABLE 1B

| | Examples | | | | | |
|---|---|---|---|---|---|---|
| | Example A8 | Example A9 | Example A10 | Example A11 | Example A12 | Example A13 |
| Label base member | 50 μm White PET B | 50 μm White PET A | 50 μm White PET A | 50 μm White PET A | 50 μm White PET A | 50 μm White PET A |
| Separator base member | 100 μm Heat resistance PET Y | 75 μm Heat resistance PET Z | 75 μm Heat resistance PET Z | 75 μm Heat resistance PET Z | 75 μm Heat resistance PET Z | 75 μm Heat resistance PET Z |
| Thickness of toner image receiving layer (μm) | 7 μm | 2 μm | 7 μm | 17 μm | 7 μm | none |
| Stored elasticity of thermoplastic resin (Pa) | 250 | 10 | 400 | 10 | 10 | — |
| Amount of releasing agent (weight %) | 3 | 3 | 3 | 3 | 12 | — |
| Thermal shrinkage rate L of label body (%) | −0.25 | −0.45 | −0.45 | −0.45 | −0.45 | −0.45 |
| Thermal shrinkage rate S of separator (%) | −0.25 | −0.35 | −0.35 | −0.35 | −0.35 | −0.35 |
| Difference A of thermal shrinkage rates in MD direction | 0.0 | 0.1 | 0.1 | 0.1 | 0.1 | 0.1 |
| Tensile elasticity rate of separator (N/mm²) at 135° C. | 700 | 500 | 500 | 500 | 500 | 500 |

TABLE 1B-continued

| | Examples | | | | | |
|---|---|---|---|---|---|---|
| | Example A8 | Example A9 | Example A10 | Example A11 | Example A12 | Example A13 |
| Stiffness t of separator (mm) | 0.1 | 0.075 | 0.075 | 0.075 | 0.075 | 0.075 |
| Firmness B of separator (N·mm) | 0.70 | 0.21 | 0.21 | 0.21 | 0.21 | 0.21 |
| Uniformity of image gloss | ○- | Δ | Δ | ○ | Δ | Δ |
| Height of curl h (mm) | 0 mm | 7 mm | 7 mm | 7 mm | 7 mm | 7 mm |
| Edge fold | ○ | ○ | ○ | ○ | ○ | ○ |
| Fuser winding around the primary fuser | ○ | ○ | ○ | ○ | ○ | ○ |
| Fuser winding around the secondary fuser | ○ | ○ | ○ | ○ | ○ | ○ |
| Toner crack of a printed matter at high temperature and humidity after second fixing | ○ | ○ | ○ | ○ | ○ | ○ |
| Toner fixability | ○ | ○ | ○ | ○ | ○ | Δ |

TABLE 2

| | Comparative Examples | | | | | |
|---|---|---|---|---|---|---|
| | Comparative example A1 | Comparative example A2 | Comparative example A3 | Comparative example A4 | Comparative example A5 | Comparative example A6 |
| Label base member | 50 μm White PET A | 50 μm White PET D | 50 μm White PET D | 50 μm White PET C | Coated paper | 50 μm White PET A |
| Separator base member | 75 μm Heat resistance PET W | 75 μm Heat resistance PET W | 75 μm Heat resistance PET X | 75 μm Heat resistance PET W | High quality paper | High quality paper |
| Thickness of toner image receiving layer (μm) | 7 μm | 7 μm | 7 μm | 7 μm | 7 μm | 7 μm |
| Stored elasticity of thermoplastic resin (Pa) | 10 | 10 | 10 | 10 | 10 | 10 |
| Amount of releasing agent (weight %) | 3 | 3 | 3 | 3 | 3 | 3 |
| Thermal shrinkage rate L of label body (%) | −0.45 | −0.75 | −0.75 | −0.05 | — | −0.45 |
| Thermal shrinkage rate S of separator (%) | −0.35 | −0.35 | −0.35 | −0.50 | — | — |
| Difference A of thermal shrinkage rates in MD direction | 0.1 | 0.4 | 0.4 | −0.45 | — | — |
| Tensile elasticity rate of separator (N/mm²) at 135° C. | 330 | 330 | 650 | 500 | — | — |
| Thickness t of separator (mm) | 0.075 | 0.075 | 0.075 | 0.075 | — | — |
| Stiffness B of separator (N·mm) | 0.14 | 0.14 | 0.27 | 0.21 | — | — |
| Uniformity of image gloss | ○ | Immeasurable | ○ | ○ | ○ | ○ |
| Height of curl h (mm) | 7 mm | Immeasurable | 65 mm | −60 mm | 50 mm | 80 mm |
| Edge fold | ○ | Immeasurable | X | X | ○ | X |
| Fuser winding around the primary fuser | Δ | X | Δ | ○ | ○ | Δ |
| Fuser winding around the secondary fuser | ○ | Unable to evaluate | ○ | ○ | ○ | ○ |
| Toner crack of a printed matter at high temperature and humidity after second fixing | ○ | Unable to evaluate | ○ | ○ | X | ○ |
| Toner fixability | ○ | Unable to evaluate | ○ | ○ | ○ | ○ |

According to the present invention as described above, label sheets for electrophotography with a resin film as a base material and an image forming method with use thereof can be provided, wherein problems such as winding of a label sheet around the fuser, appearances of marks of winding on a label sheet at the time of printing, appearances of curls on a printed sheet, edge folds caused by significant appearances of curls, appearances of toner cracks on a printed sheet caused by changes in temperature and humidity and the like can be prevented. This invention is extremely useful for practical applications.

What is claimed is:

1. A label sheet for electrophotography, the label sheet comprising:
   a label body including a label base member and an adhesive layer disposed on one surface of the label base member, the label base member including a resin film; and
   a separator including at least a separator base member, the separator base member including a resin film, the separator being releasably bonded to the adhesive layer, and the separator including a stiffness B, as determined by the following formula (2), of at least 0.21 N·mm:

$$B = E \cdot t^3 \qquad \text{Formula (2)}$$

in which E represents tensile elasticity in N/mm² of the separator at 135° C., and t represents thickness in mm of the separator at 23° C., 50% relative humidity,
   wherein the separator further includes a thermal shrinkage rate in an MD direction thereof, when subjected to heat treatment at 150° C. for 5 minutes, of S % and the label body further includes a thermal shrinkage rate in an MD direction thereof, when subjected to heat treatment at 150° C. for 5 minutes, of L %, such that a thermal shrinkage difference A as determined by the following formula (1):

$$A = S - L \qquad \text{Formula (1)}$$

is in the range −0.3% to 0.1%.

2. The label sheet of claim 1, wherein the label body further comprises a toner image receiving layer formed at a surface of the label base member opposite to the one surface thereof, the toner image receiving layer including a thermoplastic resin with a storage elastic modulus at 130° C., 10 rad/sec in the range of 4 Pa to 250 Pa.

3. The label sheet of claim 2, wherein the toner image receiving layer further comprises a releasing agent in the range of 1 weight % to 10 weight %.

4. The label sheet of claim 1, wherein the resin film of the label base member comprises a thermally-shrunk resin film that has been subjected to heat pre-treatment.

5. The label sheet of claim 1, wherein the resin film of the label base member and the resin film of the separator base member each comprises heat resistance to at least 100° C.

6. The label sheet of claim 1, wherein the thermal shrinkage difference A is in the range −0.2% to 0.0%.

7. The label sheet of claim 1, wherein the stiffness B of the separator is at least 0.26 N·mm.

8. The label sheet of claim 2, wherein the storage elastic modulus of the thermoplastic resin at 130° C., 10 rad/sec is in the range of 4 Pa to 100 Pa.

9. The label sheet of claim 1, wherein the label base member comprises a thickness in the range of 25 $\mu$m to 150 $\mu$m.

10. The label sheet of claim 2, wherein the toner image receiving layer comprises a thickness in the range of 3 $\mu$m to 15 $\mu$m.

11. The label sheet of claim 2, wherein the toner image receiving layer comprises a surface electrical resistivity with a logarithmic value, at 28° C., 85% relative humidity, in the range of 7.0 to 9.5.

12. The label sheet of claim 2, wherein the toner image receiving layer comprises a surface electrical resistivity with a logarithmic value, at 10° C., 15% relative humidity, in the range of 10.8 to 12.0.

13. The label sheet of claim 1, wherein the resin film of the label base member comprises a filler.

14. The label sheet of claim 2, wherein the label body further comprises an anchor coating layer between the label base member and the toner image receiving layer.

15. A method for forming an image, the method comprising the steps of:

providing a label sheet for electrophotography, the label sheet including a label body which includes a label base member and an adhesive layer disposed on one surface of the label base member, and a separator which includes at least a separator base member, the label base member including a resin film, the separator base member including a resin film, the separator being releasably bonded to the adhesive layer, and the separator including a stiffness B, as determined by the following formula (2), of at least 0.21 N·mm:

$$B = E \cdot t^3 \qquad \text{Formula (2)}$$

in which E represents tensile elasticity in N/mm² of the separator at 135° C., and t represents thickness in mm of the separator at 23° C., 50% relative humidity;

forming a toner image with toner on the label body of the label sheet; and fixing the toner image to the label body of the label sheet, including melting the toner by heat, wherein the separator has a thermal shrinkage rate in an MD direction thereof, when subjected to heat treatment at 150° C. for 5 minutes, of S % and the label body has a thermal shrinkage rate in an MD direction thereof, when subjected to heat treatment at 150° C. for 5 minutes, of L %, such that a thermal shrinkage difference A as determined by the following formula (1):

$$A = S - L \qquad \text{Formula (1)}$$

is in the range −0.3% to 0.1%.

16. The method of claim 15, wherein the step of fixing the toner image includes using a belt-type fixing device.

17. The method of claim 15, further comprising the step of performing a second fixing treatment, the step of performing a second fixing treatment including using a belt-type fixing device.

18. The method of claim 15, wherein the label body comprises a toner image receiving layer formed at a surface of the label base member opposite to the one surface thereof, the toner image receiving layer including a thermoplastic resin with a storage elastic modulus at 130° C., 10 rad/sec in the range of 4 Pa to 250 Pa.

* * * * *